UNITED STATES PATENT OFFICE.

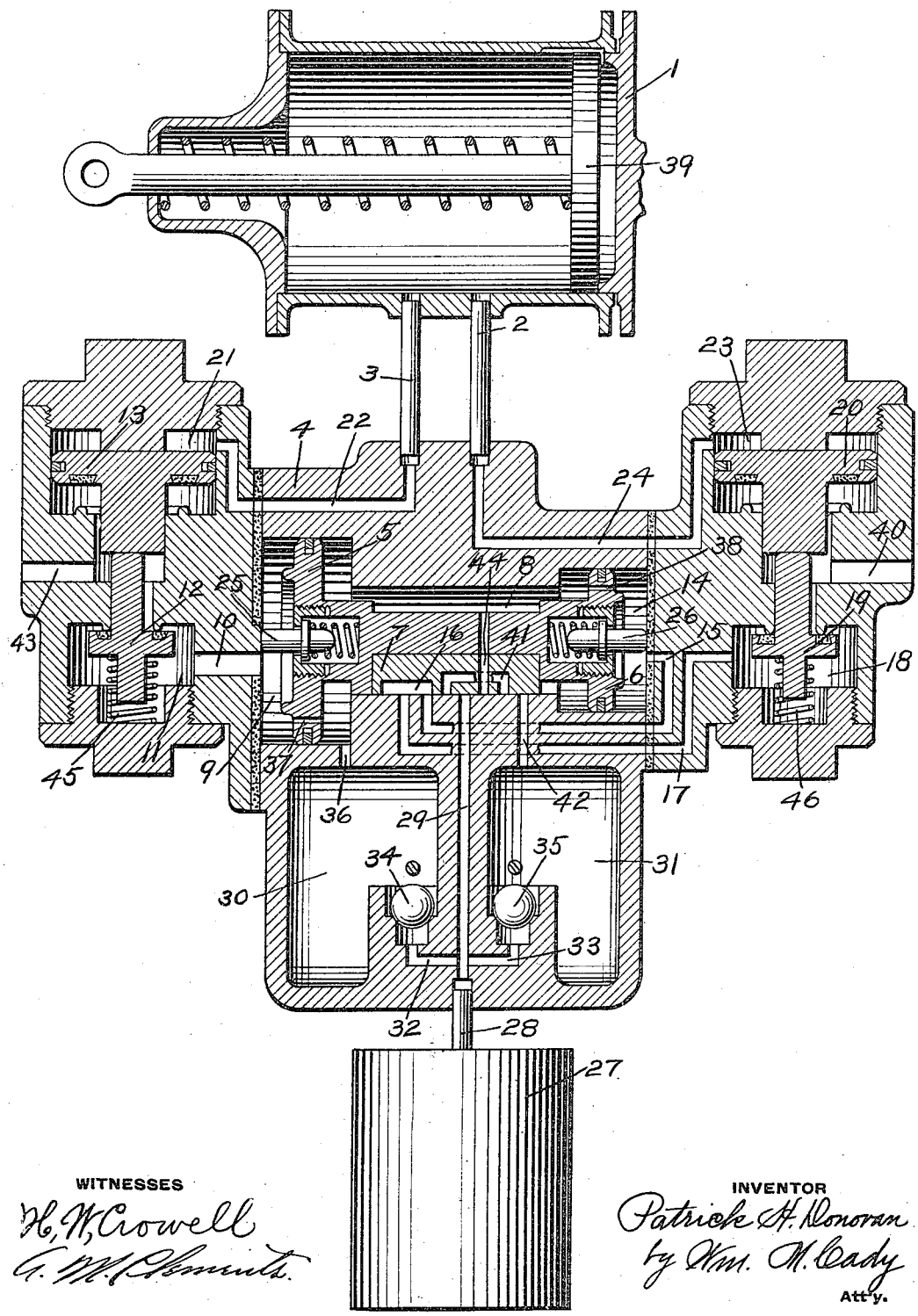

PATRICK H. DONOVAN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-CYLINDER-PRESSURE REGULATOR.

1,256,529.  Specification of Letters Patent.  Patented Feb. 19, 1918.

Application filed September 14, 1915. Serial No. 50,591.

*To all whom it may concern:*

Be it known that I, PATRICK H. DONOVAN, a citizen of the United States, residing at Edgewood, in the county of Allegheny and State of Pennsylvania, have invented new and useful Improvements in Brake-Cylinder-Pressure Regulators, of which the following is a specification.

This invention relates to fluid pressure brakes, and more particularly to a valve device for regulating the brake cylinder pressure.

In the operation of fluid pressure brakes, where the brakes are applied by effecting a reduction in brake pipe pressure, it is desirable that the degree of brake cylinder pressure obtained for a given reduction in brake pipe pressure be uniform, regardless of the brake cylinder piston travel.

The principal object of my invention is to provide means for regulating the brake cylinder pressure for a given reduction in brake pipe pressure to compensate for different brake cylinder piston travels.

In the accompanying drawing, the single figure is a sectional, diagrammatic view of a car air brake apparatus embodying my invention.

According to my invention, means are provided for changing the auxiliary reservoir volume to correspond with the brake cylinder piston travel and preferably the openings at six and eight inch piston travel which are usually provided in the brake cylinder are utilized for controlling the brake cylinder pressure regulating device.

The brake cylinder 1 as shown in the drawing has the six inch and the eight inch openings connected by the respective pipes 2 and 3 to the brake cylinder pressure regulating valve device 4.

The pressure regulating valve device 4 preferably comprises a differential piston having a large piston head 5 and a small piston head 6 for operating a slide valve 7 contained in a valve chamber 8.

The piston chamber 9 at the outer face of piston 5 is connected by a passage 10 to a valve chamber 11 containing a puppet valve 12 which is adapted to be operated by a piston 13 and the piston chamber 14 at the outer face of piston 6 is connected to a passage 15 which communicates in the normal position of slide valve 7 through cavity 16 with a passage 17. The passage 17 leads to valve chamber 18 containing a puppet valve 19 adapted to be operated by a piston 20.

The chamber 21 above piston 13 is connected by passage 22 to pipe 3 and chamber 23 above piston 20 is connected by passage 24 to pipe 2.

Spring stops 25 and 26 tend to maintain the differential piston device in the normal position shown.

The usual auxiliary reservoir 27 is connected by pipe 28 to a passage 29 leading to the seat of slide valve 7 and additional volume chambers 30 and 31 are adapted to be charged from the auxiliary reservoir through branch passages 32 and 33 having non-return check valves 34 and 35.

In operation, the auxiliary reservoir 27 being charged with fluid under pressure fluid is supplied to the additional chambers 30 and 31 and from chamber 30, fluid is supplied through a passage 36 to valve chamber 8 and thence through restricted ports 37 and 38 in the pistons 5 and 6 to the respective piston chambers 9 and 14.

If the brakes are applied and the brake cylinder piston 39 does not move out so as to uncover the pipe 2 then the brake cylinder pressure will correspond with that due to the volume of the auxiliary reservoir 27. If the brake cylinder piston moves out beyond the pipe 2, then fluid from the brake cylinder is admitted through passage 24 to piston chamber 23 and piston 20 is operated to open valve 19. Fluid is thereupon vented from piston chamber 14 through passage 15, cavity 16, passage 17 and valve chamber 18 to exhaust port 40. The unbalanced pressure in piston chamber 9 then actuates the differential piston so that the valve 7 is moved to connect passage 29 through a cavity 41 with a passage 42 leading to chamber 31. The volume of the auxiliary reservoir 27 is thus increased by the volume of chamber 31, and additional fluid is thus supplied to the brake cylinder for a given reduction in brake pipe pressure to compensate for the increased brake cylinder piston travel.

If the brake cylinder piston travel should be such as to uncover the pipe 3, then fluid will be supplied from the brake cylinder through passage 22 to piston 13 which thereupon actuates the valve 12 so that fluid is vented from piston chamber 9 to exhaust port 43.

It will here be noted that the pipe 2 is also uncovered by the movement of the brake cylinder piston 39 to open the pipe 3 and consequently the piston 20 is operated as before to open the valve 19 and vent fluid from piston chamber 14, but since the piston 5 is of greater area than piston 6, there will be an unbalanced pressure between the pistons acting in the direction of the large piston head 5, so that the parts are moved to the left and the slide valve 7 is shifted to a position in which the passage 42 is opened to valve chamber 8 while a port 44 in said valve registers with passage 29. Since chamber 30 is constantly open to valve chamber 8 through passage 36, it will be seen that in this position both chambers 30 and 31 with valve chamber 8 are connected to the auxiliary reservoir 27, so that the increased brake cylinder piston travel is compensated for by the addition of the volume of the two chambers 30 and 31 to the auxiliary reservoir volume.

The passages for establishing communication from piston 6 to the pilot valve 19 are controlled by the slide valve 7, so that when the parts move over to the position for regulating the brake cylinder pressure at the greater brake cylinder piston travel, communication is cut off between the piston chamber 14 and the valve chamber 18, as otherwise fluid could drain from the piston chamber 14 through the open valve 19, and since there is a hole through piston 6, the auxiliary reservoir pressure would soon be lost, if the brakes were held applied for any length of time.

When the brakes are released, the piston chambers 21 and 23 are vented to the atmosphere and the springs 45 and 46 close the respective puppet valves 12 and 19, thus permitting the fluid pressures to equalize around the pistons 5 and 6. Upon equalization of fluid pressure on said pistons the differential piston device is returned to normal position by one of the spring stops 25 or 26, dependent upon which operating position the parts are in.

Having now described my invention, what I claim as new and desire to secure by Letters Patent, is:

1. In a fluid pressure brake, the combination with a brake cylinder and piston and an auxiliary reservoir from which fluid is supplied to the brake cylinder, of a valve device governed according to the brake cylinder piston travel for varying the volume of the auxiliary reservoir.

2. In a fluid pressure brake, the combination with a brake cylinder and piston and an auxiliary reservoir from which fluid is supplied to the brake cylinder, of a chamber normally charged with fluid under pressure and a valve device operated upon a predetermined brake cylinder piston travel for connecting said chamber to the auxiliary reservoir.

3. In a fluid pressure brake, the combination with a brake cylinder and piston and an auxiliary reservoir from which fluid is supplied to the brake cylinder, of a chamber normally charged with fluid under pressure, a valve mechanism for controlling communication from said chamber to the auxiliary reservoir, and a puppet valve and piston operated by brake cylinder pressure upon a predetermined brake cylinder piston travel for effecting the movement of said valve mechanism to connect said chamber with the auxiliary reservoir.

4. In a fluid pressure brake, the combination with a brake cylinder and piston and an auxiliary reservoir from which fluid is supplied to the brake cylinder, of a plurality of chambers normally charged with fluid under pressure and a valve device operated at a predetermined brake cylinder piston travel for connecting one chamber to the auxiliary reservoir and at another predetermined brake cylinder piston travel for connecting another chamber to the auxiliary reservoir.

5. In a fluid pressure brake, the combination with a brake cylinder and piston and an auxiliary reservoir from which fluid is supplied to the brake cylinder, of two chambers normally charged with fluid under pressure and a valve device operated at a predetermined brake cylinder piston travel for connecting one chamber with the auxiliary reservoir and at a greater predetermined brake cylinder piston travel to connect both chambers with the auxiliary reservoir.

6. In a fluid pressure brake, the combination with a brake cylinder and piston and an auxiliary reservoir from which fluid is supplied to the brake cylinder, of two chambers normally charged with fluid under pressure, a valve movable in one direction for connecting one chamber with the auxiliary reservoir and movable in the opposite direction for connecting the other chamber with the auxiliary reservoir, a piston device having differential piston heads for operating said valve, means operated at a predetermined brake cylinder piston travel for venting fluid from one piston head to effect the movement of the valve in one direction, and means operated at a greater brake cylinder piston travel for venting fluid from the other piston head to effect the movement of said valve in the opposite direction.

7. In a fluid pressure brake, the combination with a brake cylinder and piston and an auxiliary reservoir from which fluid is supplied to the brake cylinder, of a chamber normally charged with fluid under pressure, a valve for controlling communication from said chamber to the auxiliary reservoir, a piston for operating said valve, and means operated at a predetermined brake cylinder piston travel for venting fluid from said piston, communication through which fluid is vented from said piston being controlled by said valve.

In testimony whereof I have hereunto set my hand.

PATRICK H. DONOVAN.

Witnesses:
A. M. CLEMENTS,
S. W. KEEFER.

Copies of this patent may be obtained for five cents each, by addressing the "Commissioner of Patents, Washington, D. C."